United States Patent
Chaisson, Jr.

(10) Patent No.: US 7,426,949 B2
(45) Date of Patent: Sep. 23, 2008

(54) TOOL-FREE TIRE TRACTION DEVICE

(76) Inventor: Sidney J. Chaisson, Jr., 611 W. Woodruff Dr., Baton Rouge, LA (US) 70808

( * ) Notice: Subject to any disclaimer, the term of this patent is extended or adjusted under 35 U.S.C. 154(b) by 0 days.

(21) Appl. No.: 11/286,981

(22) Filed: Nov. 23, 2005

(65) Prior Publication Data

US 2007/0113943 A1  May 24, 2007

(51) Int. Cl.
*B60C 27/20* (2006.01)
*B60C 27/10* (2006.01)
(52) U.S. Cl. .................. 152/225 R; 152/218; 152/226; 301/44.1
(58) Field of Classification Search ................. 152/174, 152/178, 181, 225 R, 170, 185, 217, 218, 152/225 C, 226, 227; 301/38.1, 41.1, 43, 301/44.1, 45, 46, 37.376, 44.4
See application file for complete search history.

(56) References Cited

U.S. PATENT DOCUMENTS

| | | | | |
|---|---|---|---|---|
| 2,463,605 A | * | 3/1949 | Devine | ........................ 152/216 |
| 2,598,851 A | * | 6/1952 | Spevak | .......................... 301/43 |
| 2,837,133 A | * | 6/1958 | Armenante et al. | .......... 152/218 |
| 3,122,192 A | * | 2/1964 | Seidell | .................... 152/225 R |
| 3,893,501 A | * | 7/1975 | Brummer et al. | ........ 152/213 R |
| 4,306,604 A | * | 12/1981 | Snider | .................... 152/225 R |
| 4,386,643 A | * | 6/1983 | Belknap et al. | .............. 152/216 |
| 5,012,848 A | * | 5/1991 | Metraux | ...................... 152/218 |
| 5,254,187 A | * | 10/1993 | Metraux | ...................... 152/216 |
| 6,053,227 A | * | 4/2000 | Robeson | ................. 152/225 R |
| 6,341,635 B1 | * | 1/2002 | Robeson | ................. 152/225 R |
| 6,983,778 B1 | * | 1/2006 | Pitts et al. | ................ 152/225 R |
| 7,380,578 B2 | * | 6/2008 | Maggi et al. | ................. 152/216 |

* cited by examiner

*Primary Examiner*—Russell D. Stormer
*Assistant Examiner*—Kip T Kotter
(74) *Attorney, Agent, or Firm*—Baker Donelson

(57) ABSTRACT

A traction device for vehicle tires is provided for when the vehicle is stuck in mud, snow, ice or similar terrain, comprising an adjustable support member having a first end and a second end; a connection member extending from the first end of the support member, wherein the connection member is connectable to a wheel; a shaft extending from said second end of said support member; and a traction member rotatably mounted to the shaft, wherein the traction member includes one or more tire-gripping portions. A double-ended embodiment of the traction device is also disclosed for providing greater traction in appropriate situations.

19 Claims, 5 Drawing Sheets

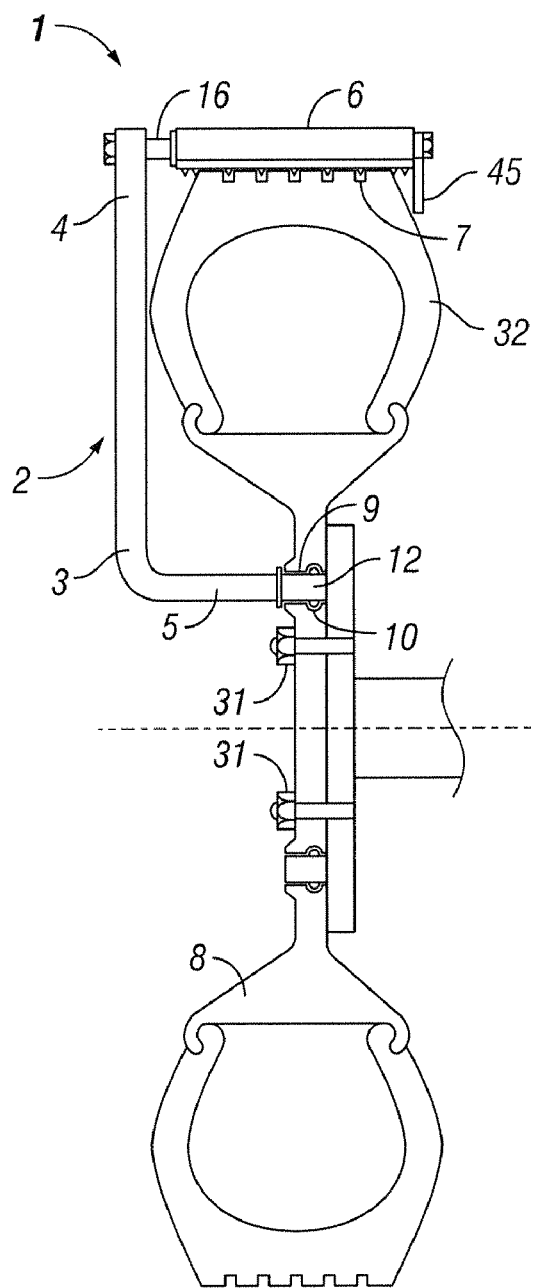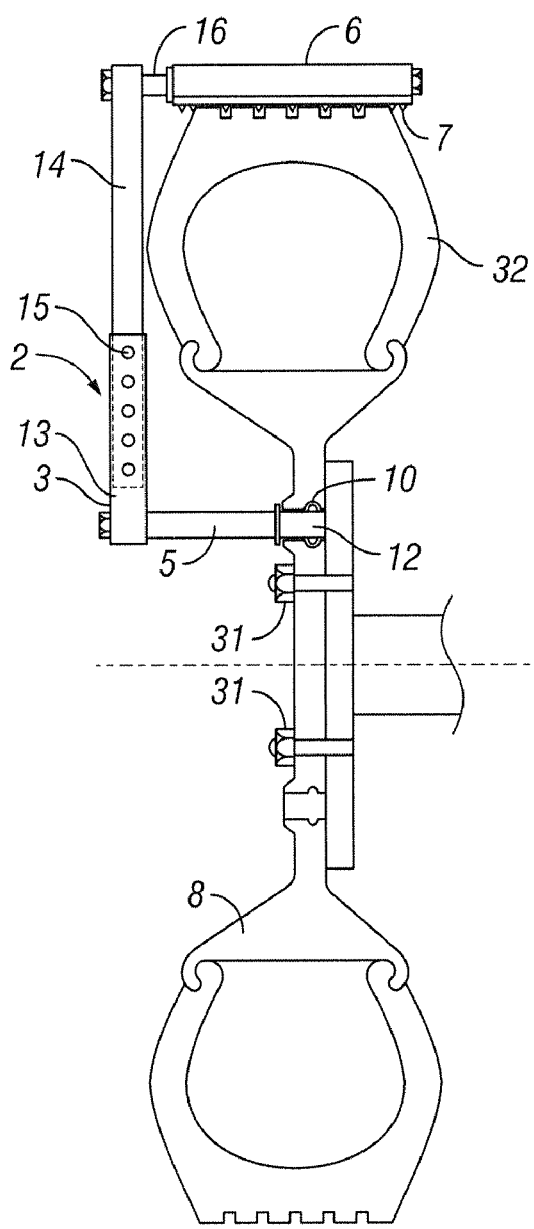
*FIG. 1*      *FIG. 2*

TOOL-FREE TIRE TRACTION DEVICE

BACKGROUND OF THE INVENTION

I. Field of the Invention

The present invention relates generally to devices used to impart traction to vehicle tires for extraction of the vehicle from mud, snow, ice, sand or similar terrain, and more particularly to such devices which are portable and quickly attachable and detachable from the wheel.

II. Background and Prior Art

Since the invention of the automobile, drivers have invariably found themselves stuck in mud, snow, ice or sand. With little or no traction between the tire and the surrounding medium, it can be exceptionally difficult to move it from its stationary position using only the engine power of the stuck vehicle. Over the years, a range of techniques have been used in an attempt to overcome the situation. To this day, for example, coarse mats or wooden boards are often placed under the tire to provide some additional traction. The problem with this technique is that the traction is only provided instantaneously, and the mats or boards are forcibly expelled from contact with the tire upon rotation of the tire.

Consequently, there have been various types of traction devices and means for attachment to a tire which are known in the prior art. Many such prior art devices are quite inconvenient or nearly impossible to attach to the vehicle wheel or tire when the vehicle has become mired in mud, snow, ice, sand or the like. Conventional winter tire chains are a well known example. Frequently the vehicle operator gets soiled while attaching the device, particularly if the vehicle must be raised by a jack in order to install the traction device. Furthermore, rain, snow or other dampness usually reduces the coefficient of friction between prior art traction devices and the tire, permitting the traction device to slip circumferentially about the tire during use. Other devices have been conceived such as short segments of chains or bars which extend across the tire tread. However, most of these devices are rather cumbersome to use and require a fastening arrangement or specific tools to hold the device onto the tire.

Along with all of the above shortcomings, it must be borne in mind that persons unfamiliar with specialized tools or emergency procedures may find themselves alone in such situations. Therefore, it is imperative that an effective tire traction device be attachable and removable quickly and easily, without the need to jack the vehicle, and without having to use tools which are often unavailable. The traction device should also be relatively small and portable, preferably adjustable for a range of wheel and tire sizes, and capable of imparting substantial traction when deployed. Based on the ensuing description and claims, it is believed that the present invention satisfies all of these requirements and provides a viable solution that is novel in comparison to the prior art.

SUMMARY OF THE INVENTION

Therefore, one object of the present invention is to provide a tool-free tire traction device which is easily and quickly attached to and detached from a vehicle wheel and tire.

It is also an object of the present invention to provide a tool-free tire traction device which is small and portable.

A further object of the present invention is to provide a tool-free tire traction device which provides substantially greater traction when deployed.

Another object of the present invention is to provide a tool-free tire traction device which is adjustable for a range of wheel and tire sizes.

BRIEF DESCRIPTION OF THE DRAWINGS

FIG. 1 depicts a preferred embodiment of a tool-free tire traction device in accordance with the present invention.

FIG. 2 depicts an alternative embodiment of the invention featuring an adjustable support member.

DETAILED DESCRIPTION OF THE PREFERRED EMBODIMENTS

Figure 3:
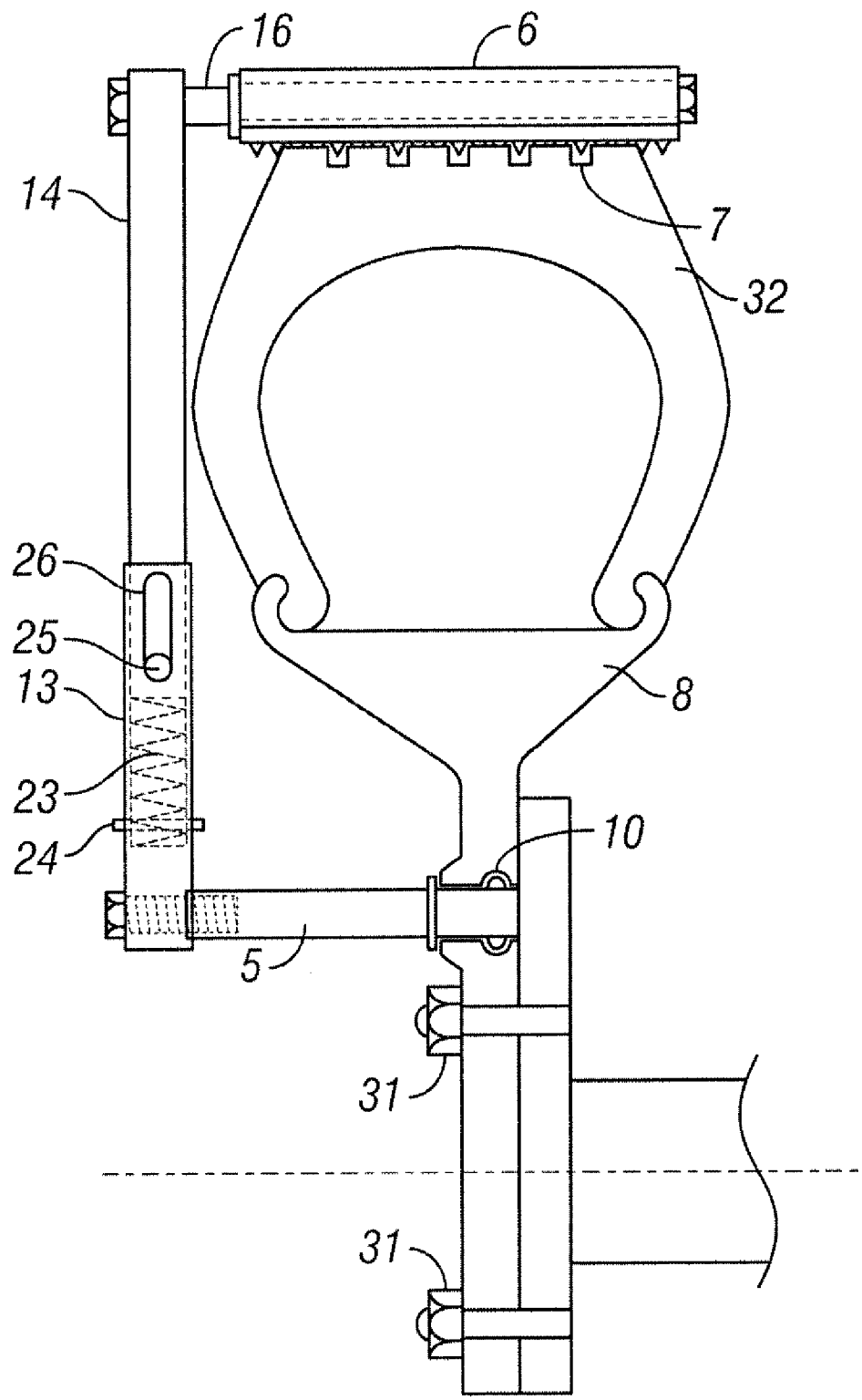
FIG. 3 depicts an alternative embodiment which illustrates a spring-biased adjustability feature for the support member.

Turning now to FIG. 1, a preferred embodiment of a tool-free tire traction device in accordance with the present invention is shown. The traction device 1 generally comprises a support member 2 having a first end 3 and a second end 4; a connection member 5 extending from the first end 3 of the support member 2; a shaft 16 extending from the second end 4 of the support member 2; and a traction member 6 rotatably mounted to the shaft 16. Preferably, the traction member 6 further includes one or more tire-gripping devices 7.

Figure 4:
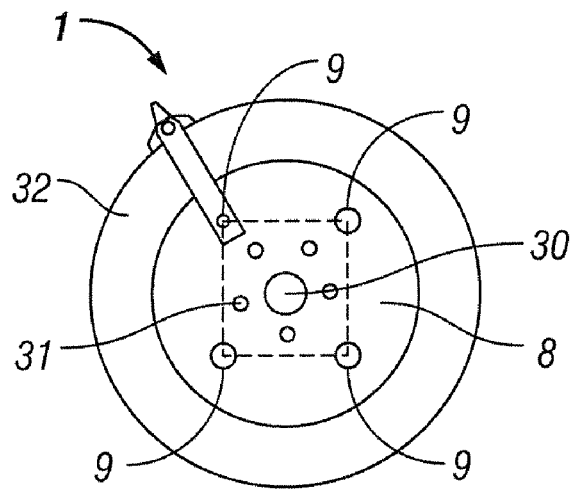
FIG. 4 depicts is an elevation view of a typical vehicle wheel having a plurality of mounting holes with a traction device installed in an operative position.

With specific reference to the connection member 5, FIG. 2 depicts one alternative embodiment wherein the connection member 5 is a separate part attached by a common fastener to the first end 3 of the support member 2. The connection member 5 is adapted to matably engage a portion of the wheel 8. For example, the connection member 5 may be a simple pin 12 adapted for matable insertion into a specially formed mounting hole 9 on the wheel 8. A predetermined plurality and pattern of such mounting holes 9 are preferably provided on the wheel 8 during its manufacture, such that the traction device 1 may be placed in any one of a multiple of locations. FIG. 4 illustrates a typical vehicle wheel comprising a hub 30, a wheel 8, mounting lugs 31, and the tire 32. Traction device mounting holes 9 are shown in at least four places, with a traction device 1 installed in an operative position. For example, when a vehicle is stuck in mud or snow, the lower half of the wheel 8 may be embedded up to the axle, thus obscuring one or more mounting holes 9. However, the remaining visible mounting holes 9 will be available for mounting of the traction device 1. Optionally, as shown in the detail view of FIG. 3, in order to prevent the traction device 1 from inadvertently detaching from the wheel 8, a locking device 10 may be included on the connection member 5 that may engage a portion of the wheel 8. One form of such a locking device 10 would be a spring-loaded ball bearing located along the pin 12, which engage a circumferential groove on the inside of the mounting hole 9.

With respect to the support member 2, it is desirable that it be adjustable in length. Specifically, referring to FIGS. 2 and 3, the support member 2 may include a primary member 13 and a secondary member 14, wherein the primary member 13 and the secondary member 14 are coaxially and telescopingly connected to one another. When configured in this manner, a locking device 15 should be present and configured to lock the position of the primary member 13 relative to the secondary member 14. While the locking device 15 may comprise a variety of forms, a preferred method would include a spring-loaded pin on the inside telescoping member which is engageable with any one of a multiple of locking holes formed into the outside telescoping member. Alternatively, both primary and secondary members 13, 14 may include a plurality of holes which can be matched for the appropriate length, and then locked by a separate locking pin inserted across both primary and secondary members 13, 14. Optionally, the primary member 13 may further be resiliently biased toward the secondary member 14 by an internal spring 23 within the telescoping arrangement as best shown in FIG. 3. In such a configuration, the spring 23 may be used to bias the telescoping members to a normally shortened length, such that extension of the telescoping members against the resilient bias of the spring 23 would allow extension of the support member 2. One end of the spring 23 would be held in place relative to the primary member 13 by a cross-pin 24, while the opposite end of the spring 23 would be attached to secondary member 14. To prevent separation of primary and secondary members 13, 14, secondary member includes a pin 25 which travels within a guide slot 26 formed into primary member 13. At least one advantage of this configuration is that once the traction device 1 is installed, the spring would additionally serve to hold the traction device 1 in placed prior to powering the wheel 8. When installed, the support member 2 should be substantially parallel with a radius of the wheel 8.

Yet another means of adjusting the length of the support member 2 would be achieved by having the primary member 13 and the secondary member 14 coaxially and threadably connected to one another. In that configuration, the primary member 13 may be turned relative to the secondary member 14 until the desired length is achieved prior to installation of the traction device 1 on the wheel 8.

The traction member 6 is the key element of the present invention, as it makes the contact with the mud, snow, or terrain in which the vehicle may be immobilized. As indicated above, the traction member 6 is rotatably mounted onto the shaft 16, and retained by conventional bolts or nuts at opposite ends of the shaft 16. Optionally, a retaining clip 45 may also be installed onto shaft 16, which extends toward the tire 32 to assist in preventing any substantial lateral movement of the device 1 during operation. The retaining clip 45 may simply comprise a metal plate having a slot, such that it can freely move with respect to the shaft 16. During use, the retaining clip 45 will be urged inward by the force of the terrain, but it should be easily movable for removal of the device 1 from the tire 32.

Figure 5:
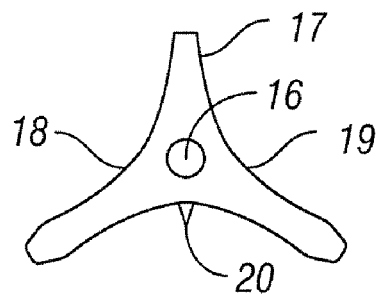
FIGS. 5 and 6 are alternative cross-sectional shapes for a traction member which engages the tire.
Figure 6:
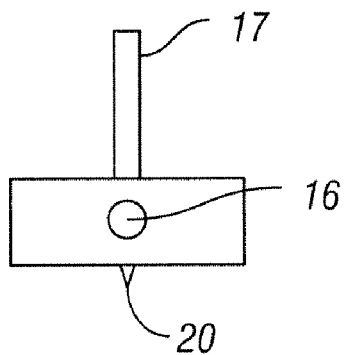

Traction member 6 may comprise a wide range of cross-sectional shapes designed to make the best traction with the terrain. For example, FIGS. 5 and 6 show at least two possible alternative cross-sectional shapes, with the understanding that there can be many variations having substantially the same function. Regardless of the cross-sectional shape, however, the traction member 6 will include at least one traction blade 17 extending longitudinally along the traction member 6. The traction blade 17 will typically be approximately the same length as the width of the tire 32, because such length would provide the greatest traction. In one embodiment shown in FIG. 5, the traction blade 17 is shown roughly in the form of triangle, such that there are opposing concave surfaces 18, 19 which contact the terrain. In addition to the traction blade 17, the traction member 6 also preferably includes a plurality of tread-engaging cleats 20 placed longitudinally along the length of traction member 6. Cleats 20 serve to anchor the traction member 6 against the treads of the tire 32 when installed to minimize lateral and circumferential movement of the device 1 as the wheel 8 is being turned.

Figure 7:
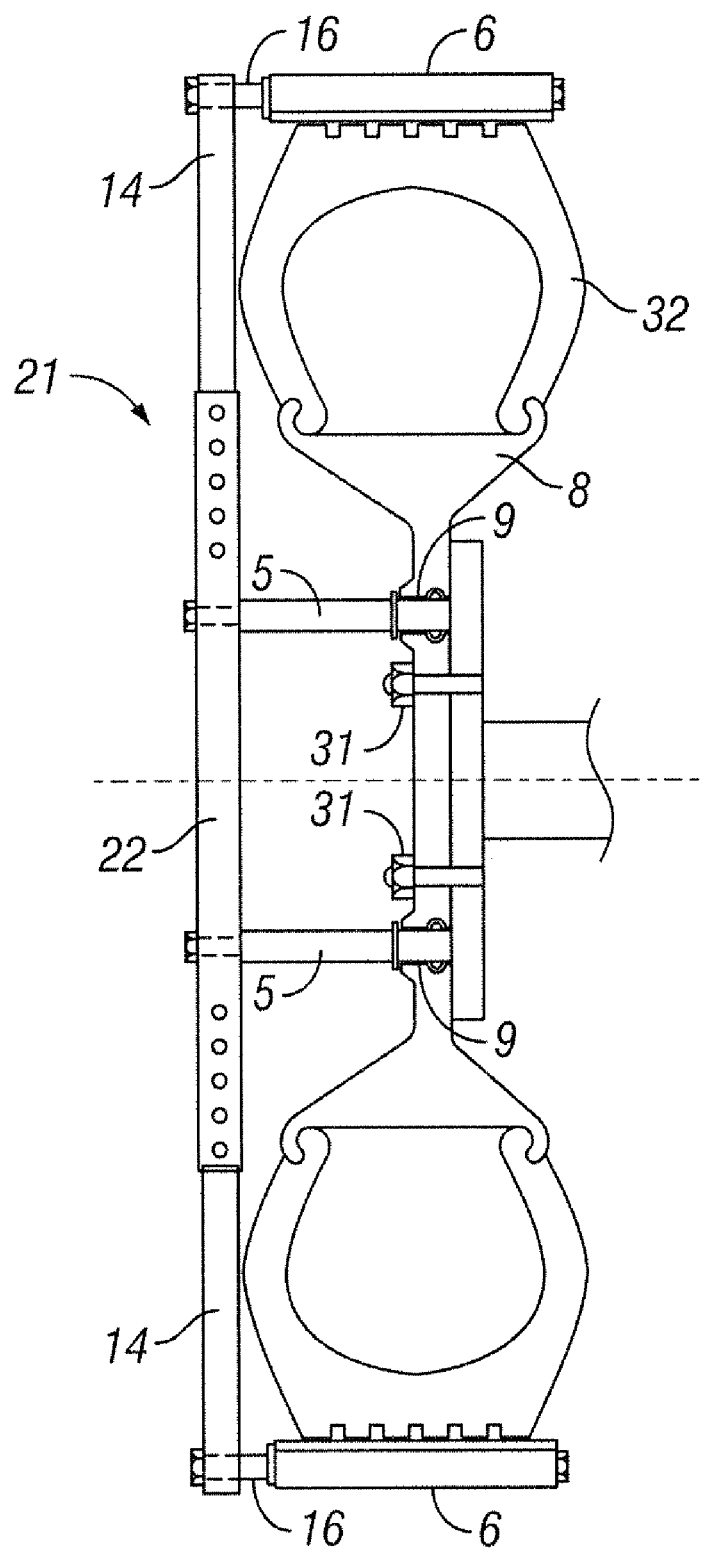
FIG. 7 depicts a double-ended embodiment of the invention which mounts across two of the mounting holes in the wheel.

An alternative embodiment of the invention is also shown in FIG. 7, which is a double-ended traction device 21. Construction of the alternative embodiment device 21 is similar in most respects. However, the device 21 includes a crossbar 22 which is mounted onto two or more mounting holes 9, such that a traction member 6 is located along two locations on the tire 32. In the adjustable version shown, the two secondary members 14 may be extended as required or configured with the spring system as described with respect to FIG. 3. By virtue of its design, this embodiment affords potentially double the traction in comparison to the first embodiment.

Figure 8:
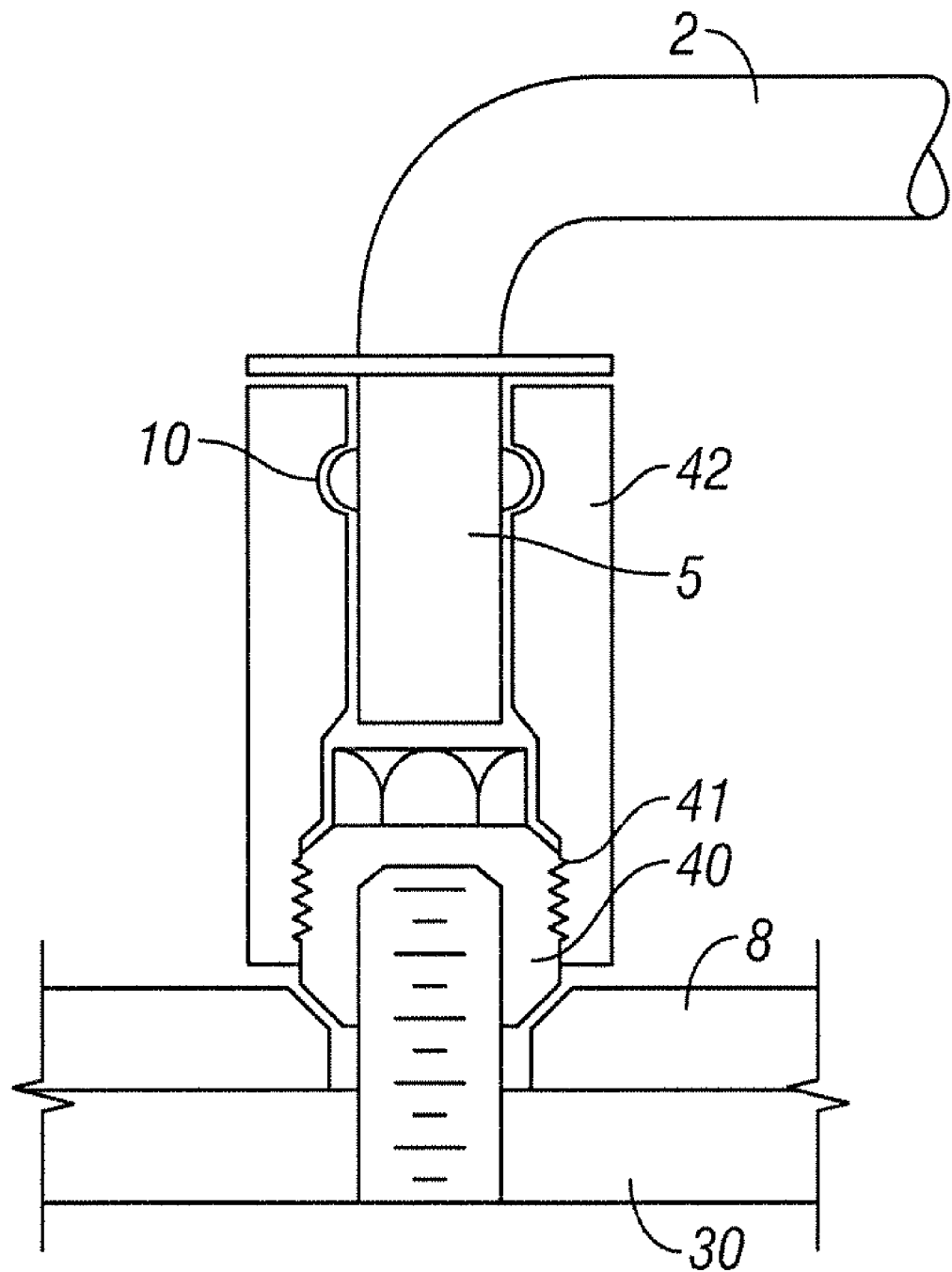
FIG. 8 is another embodiment of a traction device mounting system employing re-designed lugs and an adaptor socket which permit use of the invention with any standard wheel.

Finally, as shown in FIG. 8, an alternative means of mounting the traction device 1 is illustrated in detail. In this embodiment, when the wheel 8 is mounted in the normal manner to the hub 30, one or more of the standard mounting lugs 31 are replaced by re-designed lugs 40, which have additional external threads 41. When the need to use the traction device 1 arises, an adaptor socket 42 having internal threads is matably engaged to the new lug 40 simply by hand tightening. The socket 42 includes a cylindrically shaped internal opening which can receive the connection member 5 as described earlier herein. Such connection can be secured by the same type of locking device 10 as well, namely spring-loaded balls located on the connection member 5 which engage a circumferential groove on the inside of the socket 42. In this novel arrangement, no special modifications to the wheel 8 are required, and any standard wheel 8 can be used with the traction device 1 merely by attaching the adaptor socket 42 over the new lugs 40.

It should be noted that the present invention can easily be used in connection with snow chains to augment the traction required for a particular situation. For example, while conventional snow chains generally comprise a continuous network of links which surround the entire circumference of a tire, shorter lengths of snow chains may be employed which cover a smaller portion of the circumference. Specifically, a short section of snow chain, i.e. one that covers only 25% to 40% of the circumference, can be attached to at least two instances of the present invention when the devices 1 are mounted to a wheel. In this arrangement, the traction member 6 is removed from each of the devices 1, thereby exposing the shaft 16. Links on the snow chains may then be slid over the shaft 16 on one of the devices 1, while the links on the opposite end of the snow chain are attached similarly to a second device 1. Finally, the bolt or other hardware is reinstalled at the end of shaft 16, perhaps with a large washer, in order to prevent inadvertent slippage of the snow chains off of the device 1.

Although exemplary embodiments of the present invention have been shown and described, many changes, modifications, and substitutions may be made by one having ordinary skill in the art without necessarily departing from the spirit and scope of the invention.

I claim:

1. A traction device for vehicle tires, comprising:
   (a) a radially extending support member having a first end and a second end;
   (b) an axially extending connection member extending from said first end of said radially extending support member;
   (c) a mounting lug for attaching a wheel to a vehicle, wherein said mounting lug includes external threads formed thereon;
   (d) an adaptor socket matably engageable with said external threads on said mounting lug, wherein said adaptor socket has an axially extending internal opening to receive said axially extending connection member, wherein said axially extending connection member is directly connectable to said adaptor socket on said vehicle wheel; and (e) an axially extending traction member connected to said second end of said support member, wherein said axially extending traction member includes one or more tire-gripping portions.

2. The device of claim 1, wherein said radially extending support member is adjustable in length.

3. The device of claim 2, wherein said radially extending support member includes a primary member and a secondary member, and wherein said primary and secondary members are coaxially and telescopingly connected to one another.

4. The device of claim 3, wherein said primary and secondary members include a locking device configured to lock the position of said primary member relative to said secondary member.

5. The device of claim 3, wherein said primary member is resiliently biased toward said secondary member.

6. The device of claim 1, wherein said traction member includes a plurality of tread-engaging cleats.

7. The device of claim 1, wherein an axially extending shaft extends from said second end of said radially extending support member.

8. The device of claim 7, wherein said axially extending traction member includes at least one traction blade extending longitudinally along said axially extending traction member, and a retaining clip operatively connected to a terminal end of said axially extending shaft and adapted to contact said tire upon lateral movement of said device.

9. The device of claim 8, wherein said traction blade is approximately the same length as the width of said tire.

10. A traction device for vehicle tires, comprising:
(a) a crossbar member having a radially extending first end and a radially extending second end;
(b) one or more axially extending connection members extending from said crossbar member;
(c) one or more mounting lugs for attaching a wheel to a vehicle, wherein said mounting lugs include external threads formed thereon;
(d) one or more adaptor sockets matably engageable with said external threads on a respective mounting lug, wherein each of said adaptor sockets has an axially extending internal opening to receive a respective axially extending connection member and each of said axially extending connection members is directly connectable to a respective adaptor socket on said vehicle wheel; and (e) a first axially extending traction member and a second axially extending traction member connected to a respective one of said first and second ends of said crossbar member, wherein each of said axially extending traction members include one or more tire-gripping portions.

11. The device of claim 10, wherein said crossbar member is adjustable in length.

12. The device of claim 11, wherein each of said first and second ends of said crossbar member includes a primary member and a secondary member, and wherein said primary and secondary members are coaxially and telescopingly connected to one another.

13. The device of claim 12, wherein said primary and secondary members include a locking device configured to lock the position of said primary member relative to said secondary member.

14. The device of claim 12, wherein said primary member is resiliently biased toward said secondary member.

15. The device of claim 11, wherein each of said first and second ends of said crossbar member includes a primary member and a secondary member, and wherein said primary and secondary members are coaxially and threadably connected to one another.

16. The device of claim 10, wherein said traction member includes a plurality of tread-engaging cleats.

17. The device of claim 10, wherein said traction member includes at least one traction blade extending longitudinally along said traction member.

18. The device of claim 17, wherein said traction blade is approximately the same length as the width of said tire.

19. The device of claim 10, wherein a first axially extending shaft and a second axially extending shaft extend from said first end and said second end of said crossbar member, respectively.

* * * * *